US010772037B2

(12) United States Patent
Shimojou et al.

(10) Patent No.: US 10,772,037 B2
(45) Date of Patent: Sep. 8, 2020

(54) GATEWAY SELECTION METHOD AND COMMUNICATION SYSTEM

(71) Applicant: NTT DOCOMO, INC., Tokyo (JP)

(72) Inventors: Takuya Shimojou, Tokyo (JP); Masayoshi Shimizu, Tokyo (JP); Daisuke Nojima, Tokyo (JP); Akira Yamada, Tokyo (JP); Shigeru Iwashina, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/337,976

(22) PCT Filed: Sep. 20, 2017

(86) PCT No.: PCT/JP2017/033941
§ 371 (c)(1),
(2) Date: Mar. 29, 2019

(87) PCT Pub. No.: WO2018/061942
PCT Pub. Date: Apr. 5, 2018

(65) Prior Publication Data
US 2020/0029273 A1    Jan. 23, 2020

(30) Foreign Application Priority Data

Sep. 30, 2016 (JP) ................................. 2016-194374

(51) Int. Cl.
*H04W 48/18* (2009.01)
*H04W 48/14* (2009.01)
*H04W 88/16* (2009.01)

(52) U.S. Cl.
CPC ........... *H04W 48/18* (2013.01); *H04W 48/14* (2013.01); *H04W 88/16* (2013.01)

(58) Field of Classification Search
CPC ..... H04W 48/18; H04W 48/16; H04W 16/32; H04W 28/06; H04W 36/04; H04W 36/14;
(Continued)

(56) References Cited

U.S. PATENT DOCUMENTS 5,920,818 A * 7/1999 Frodigh ................ H04W 36/32
370/331
6,571,095 B1 * 5/2003 Koodli .............. H04L 29/12009
455/435.1
(Continued)

FOREIGN PATENT DOCUMENTS

JP     2003520000 A    6/2003
JP     2008529365 A    7/2008
(Continued)

OTHER PUBLICATIONS

International Preliminary Report on Patentability from PCT/JP2017/033941 dated Apr. 2, 2019 (8 pages).
(Continued)

*Primary Examiner* — Jean A Gelin
(74) *Attorney, Agent, or Firm* — Osha Liang LLP

(57) ABSTRACT

In a communication system (1), when there is no access destination corresponding to a service type to be used by a piece of UE (50) in one of cellular communication and non-cellular communication, a retrieval unit (13) of a DB server (10) selects an access destination by referring to correspondence information in the other of the cellular communication and the non-cellular communication. Thus, when there is no access destination corresponding to the service type to be used by the UE (50) in one of the cellular communication and the non-cellular communication, the access destination corresponding to the service type is selected in the other of the cellular communication and the non-cellular communication. Therefore, it is possible to select an access destination suitable for the service type from both the cellular communication and the non-cellular communication.

9 Claims, 9 Drawing Sheets

(58) Field of Classification Search
CPC ..... H04W 36/32; H04W 40/02; H04W 76/11; H04W 84/12
See application file for complete search history.

(56) References Cited

U.S. PATENT DOCUMENTS

| | | | |
|---|---|---|---|
| 7,149,195 B2* | 12/2006 | Kall | H04W 72/005 370/328 |
| 7,277,705 B2* | 10/2007 | Casaccia | H04W 48/18 455/432.1 |
| 7,328,016 B2* | 2/2008 | Buckley | H04W 8/183 455/435.2 |
| 8,532,055 B2* | 9/2013 | Chaudry | H04W 40/02 370/331 |
| 8,818,449 B2* | 8/2014 | Buckley | H04W 48/12 370/338 |
| 2005/0193150 A1* | 9/2005 | Buckley | H04L 67/2842 709/250 |
| 2011/0058517 A1* | 3/2011 | Yoshiuchi | H04W 60/005 370/328 |
| 2011/0216743 A1* | 9/2011 | Bachmann | H04L 63/164 370/331 |
| 2014/0018069 A1* | 1/2014 | Willey | H04W 48/18 455/434 |
| 2016/0037328 A1* | 2/2016 | Raveendran | H04W 8/08 370/328 |
| 2016/0065407 A1* | 3/2016 | Saltsidis | H04L 41/0853 370/255 |
| 2016/0249278 A1* | 8/2016 | Qi | H04W 48/14 |
| 2018/0255481 A1* | 9/2018 | Chen | H04W 76/11 |

FOREIGN PATENT DOCUMENTS

| | | |
|---|---|---|
| JP | 2014513460 A | 5/2014 |
| WO | 2015062098 A1 | 5/2015 |

OTHER PUBLICATIONS

3GPP TS 23.401 V14.1.0; "3rd Generation Partnership Project; Technical Specification Group Services and System Aspects; General Packet Radio Service (GPRS) enhancements for Evolved Universal Terrestrial Radio Access Network (E-UTRAN) access (Release 14)"; Sep. 2016 (378 pages).

* cited by examiner

Fig.2

| USER/SERVICE INFORMATION | SERVICE TYPE |
|---|---|
| BBB | XXX |
| CCC | YYY |
| DDD | ZZZ |

| SERVICE TYPE | ACCESS DESTINATION INFORMATION (SGW) (FOR EXAMPLE: IP ADDRESS) |
|---|---|
| XXX | xx.xx.xx.xx |

(B)

| SERVICE TYPE | ACCESS DESTINATION INFORMATION (ePDG, PGW) (FOR EXAMPLE: IP ADDRESS) |
|---|---|
| SSS | SS.SS.SS.SS |
| TTT | TT.TT.TT.TT |
| UUU | UU.UU.UU.UU |

*Fig.9*

| SERVICE TYPE | USER/SERVICE INFORMATION | ACCESS DESTINATION INFORMATION (FOR EXAMPLE: IP ADDRESS) |
|---|---|---|
| XXX | BBB | xx.xx.xx.xx |
| YYY | CCC | yy.yy.yy.yy |
| ZZZ | DDD | zz.zz.zz.zz |

GATEWAY SELECTION METHOD AND COMMUNICATION SYSTEM

TECHNICAL FIELD

The present invention relates to a gateway selection method and a communication system.

BACKGROUND ART

In the related art, Non-Patent literature 1 describes that a mobility management entity (MME) is selected on the basis of a terminal type of user equipment (UE) that makes an attachment request, and the selected MME selects a serving gateway (SGW) on the basis of load information.

CITATION LIST

Non-Patent Literature

[Non-Patent literature 1] 3GPP TS 23.401

SUMMARY OF INVENTION

Technical Problem

However, according to the above related art, there is only means for selecting an SGW on the basis of allocable resources in each SGW. Therefore, there is a problem that one piece of UE is likely to be unable to access a plurality of gateways (for example, an SGW) suitable for the requirements of a communication service for each communication service. Therefore, it is preferable to be able to select a gateway satisfying requirements of a communication service requested by the UE.

Meanwhile, there are pieces of UE capable of both cellular communication and non-cellular communication. Therefore, it is preferable to be able to select a gateway suitable for the requirements of a communication service, from both cellular communication and non-cellular communication.

Therefore, an object of the present invention is to select a gateway suitable for requirements of a communication service requested by UE from both cellular communication and non-cellular communication in order to solve the above problem.

Solution to Problem

In order to solve the above-described problem, a gateway selection method according to an embodiment of the present invention is a gateway selection method for selecting a gateway device that performs communication for a communication service to be used by a terminal, which is executed by a communication system including the terminal capable of using a communication service and a plurality of gateway devices, the gateway selection method including: a selection step of selecting, when there is no gateway device corresponding to a communication service to be used by the terminal in one of the cellular communication and the non-cellular communication, a gateway device that performs communication for the communication service to be used by the terminal by referring to correspondence information in which a communication service and a gateway device that performs communication for using the communication service are associated with each other, in the other of the cellular communication and non-cellular communication.

Further, a communication system according to an embodiment of the present invention is a communication system including a terminal capable of using a communication service and a plurality of gateway devices that perform communication for using the communication service, the communication system including a selection unit that selects, when there is no gateway device corresponding to a communication service to be used by the terminal in one of cellular communication and non-cellular communication, a gateway device that performs communication for a communication service to be used by the terminal by referring to correspondence information in which a communication service and a gateway device that performs communication for using the communication service are associated with each other, in the other of the cellular communication and non-cellular communication.

According to the present invention, when there is no gateway device corresponding to the communication service to be used by the terminal in one of the cellular communication and the non-cellular communication, the gateway device is selected by referring to the correspondence information on the other. Therefore, even when there is no gateway device corresponding to the communication service to be used by the terminal in one of the cellular communication and the non-cellular communication, it is possible to select the gateway device corresponding to the communication service to be used by the terminal in the other. Thus, it is possible to select a gateway device suitable for requirements of the communication service requested by the terminal from both the cellular communication and non-cellular communication.

Advantageous Effects of Invention

According to the present invention, it is possible to select a gateway suitable for requirements of a communication service requested by a terminal from both cellular communication and non-cellular communication.

BRIEF DESCRIPTION OF DRAWINGS

FIG. 2 is a diagram illustrating information stored in a HSS.

FIG. 4 is a diagram illustrating information stored in the slice selection device and the DB server.

FIG. 9 is a diagram illustrating an example of correspondence information according to another embodiment.

DESCRIPTION OF EMBODIMENTS

Figure 1:
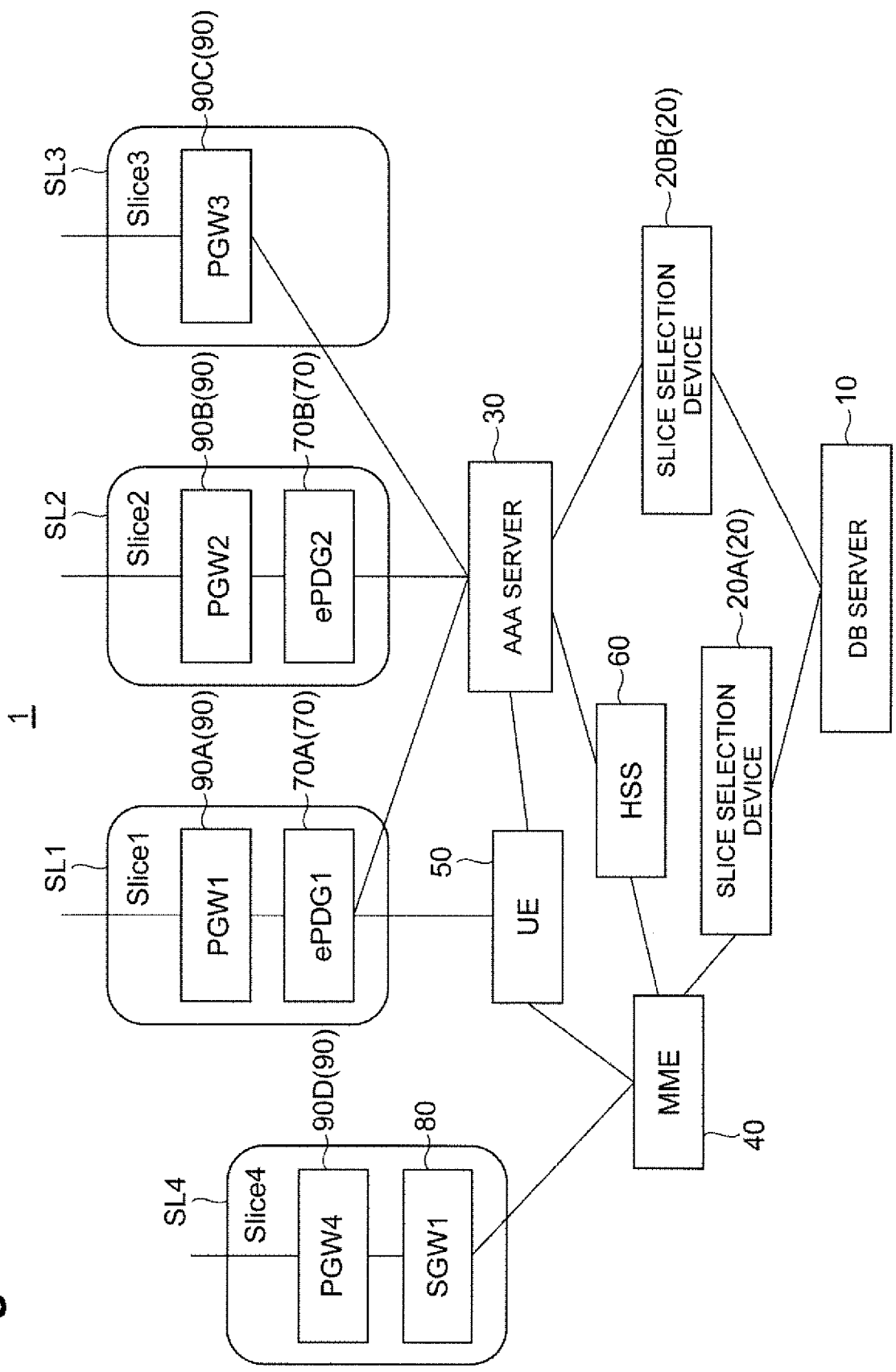
FIG. 1 is a diagram illustrating a system configuration of a communication system according to an embodiment of the present invention.

Hereinafter, modes for carrying out the present invention will be described in detail with reference to the accompanying drawings. It should be noted that in the description of the drawings, the same elements are denoted by the same reference numerals and redundant description will be omitted.

FIG. 1 is a system configuration diagram of a communication system 1 according to an embodiment of the present invention. The communication system 1 includes a DB server 10, a slice selection device 20 (a slice selection device 20A and a slice selection device 20B), an AAA server 30, an MME 40, UE 50 capable of using a communication service, a HSS 60, an ePDG 70, an SGW 80, and a PGW 90. Further, this communication system 1 is a system that provides a communication service using non-cellular communication (non-3GPP access).

Here, the non-cellular communication means communication (a wireless local area network (LAN) or the like) other than cellular communication. Further, the communication service is a service using communication, and is a service such as moving image distribution or inter-vehicle communication. In each communication service, required network requirements are different. The UE 50 stores a service type which is information indicating the network requirements, as information indicating the communication service.

The slice selection device 20 is a device (a slice selection function) that selects a slice corresponding to a communication service that is used by the UE 50 in response to an access request from the UE 50. The slice is a virtual network or a service network logically generated on a network infrastructure by virtually separating resources of links and nodes of a network device and coupling the separated resources, and the slices include separate resources and do not interfere with each other. A slice SL1 secures resources of the ePDG 70A and the PGW 90A, and a slice SL2 secures resources of the ePDG 70B and the PGW 90B. In addition, a slice SL3 secures resources of the PGW 90C and a slice SL4 secures the resources of the SGW 80 and the PGW 90D.

The slice selection device 20 stores information in which the service type and addresses of the gateway devices (the ePDG 70, the SGW 80, and the PGW 90) constituting the slice satisfying requirements of the service type are associated with each other. Further, the slice selection device 20 determines a slice (a default slice) to be accessed when there is no slice corresponding to the service type in advance, and also stores an address of the gateway device constituting the default slice. When the slice selection device 20 receives an inquiry request for the access destination from the AAA server 30 or the MME 40, the slice selection device 20 transmits the address corresponding to the request to the AAA server 30 or the MME 40 by referring to the above information. The slice selection device 20A is a device accessible using cellular communication. Further, the slice selection device 20B is a device accessible using non-cellular communication.

For example, the slice selection device 20A stores information (correspondence information) in which the service type and the address information of the SGW 80 serving as an access destination of the slice are associated with each other in the cellular communication. When the slice selection device 20A receives the service type from the MME 40, the slice selection device 20A determines whether or not there is address information corresponding to the service type. When there is no address information corresponding to the service type, the slice selection device 20A requests the DB sewer 10 to perform searching as to whether or not there is address information corresponding to the service type in the non-cellular communication.

Further, the slice selection device 208 stores correspondence information in which the service type and the address information of the ePDG 70 and the PGW 90 serving as the access destinations of the slice are associated with each other in non-cellular communication. When the slice selection device 20B receives the service type and the access type (information indicating which of trusted non-3GPP access or untrusted non-3GPP access is being used) from the AAA server 30, the slice selection device 208 determines whether or not there is address information corresponding to the service type. When there is no address information corresponding to the service type, the slice selection device 20B requests the DB server 10 to perform searching as to whether or not there is address information corresponding to the service type in the cellular communication.

The DB server 10 is a database server that stores information in which the service type and the addresses of the gateway devices (the ePDG 70, the SGW 80, and the PGW 90) constituting the slice are associated with each other. The DB server 10 stores correspondence information stored in the slice selection device 20A and the slice selection device 20B. When the DB server 10 receives a search request from the slice selection device 20A, the DB server 10 searches for the address information corresponding to the service type by referring to the correspondence information in which the service type and the address information of the ePDG 70 and the PGW 90 are associated with each other, and notifies the slice selection device 20A of the presence or absence of the address information corresponding to the service type. When the DB server 10 receives the search request from the slice selection device 20B, the DB server 10 searches for the address information corresponding to the service type by referring to the correspondence information in which the service type and the address information of the SGW 80 are associated with each other, and notifies the slice selection device 20B of the presence or absence of the address information corresponding to the service type.

The AAA server 30 is a server device that performs access control of the UE 50 that performs access via a wireless LAN.

The MME 40 is a unit that performs position management and authentication control of the UE 50 present in an LTE network and a process of setting a communication path of user data between the SGW 80 and a base station.

The user equipment (UE) 50 (terminal) including a smartphone or a tablet terminal can communicate with this communication system 1 through wireless communication or the like. Further, the UE 50 stores identification information (user information) of the UE 50 and transmits the information to any device among the AAA server 30, the ePDG 70, or the MME 40. When UE 50 performs cellular communication, the UE 50 performs transmission to the MME 40. Further, when the untrusted non-3GPP access is used, the UE 50 communicates with the AAA server 20 via the ePDG 70. Further, when the trusted non-3GPP access is used, the UE 50 communicates with the AAA server 30 without passing through the ePDG 70. The AAA server 30 transmits an access type to the slice selection device 20B.

The HSS 60 is a server that manages subscriber information including contract information, authentication information, communication service information, terminal type information, and location information of a communication terminal such as the UE 50 in a database. The HSS 60 includes user information (for example, a network access identity (NAI)), international mobile subscriber identity (IMSI), or global unique temporary identity (GUTI)), and a service type. For example, this information includes user information and a service type, as illustrated in FIG. 2.

The ePDG 70 is a unit that transmits user data as a gateway device between a core network and the wireless LAN, and is a gateway device that communicates with the UE 50.

The SGW 80 is a serving packet switch that accommodates LTE, and transmits and receives user data to and from a packet data network gateway (PGW) 90. That is, the SGW 80 is a gateway device that transfers packets.

The PGW 90 is a gateway between a packet data network (PDN) and the core network, and transmits user data (packet data). That is, the PGW 90 is a gateway device that transfers packets.

Next, components of the DB server 10 and the slice selection device 20 having characteristics in the communication system 1 will be described with reference to FIG. 3.

Figure 3:
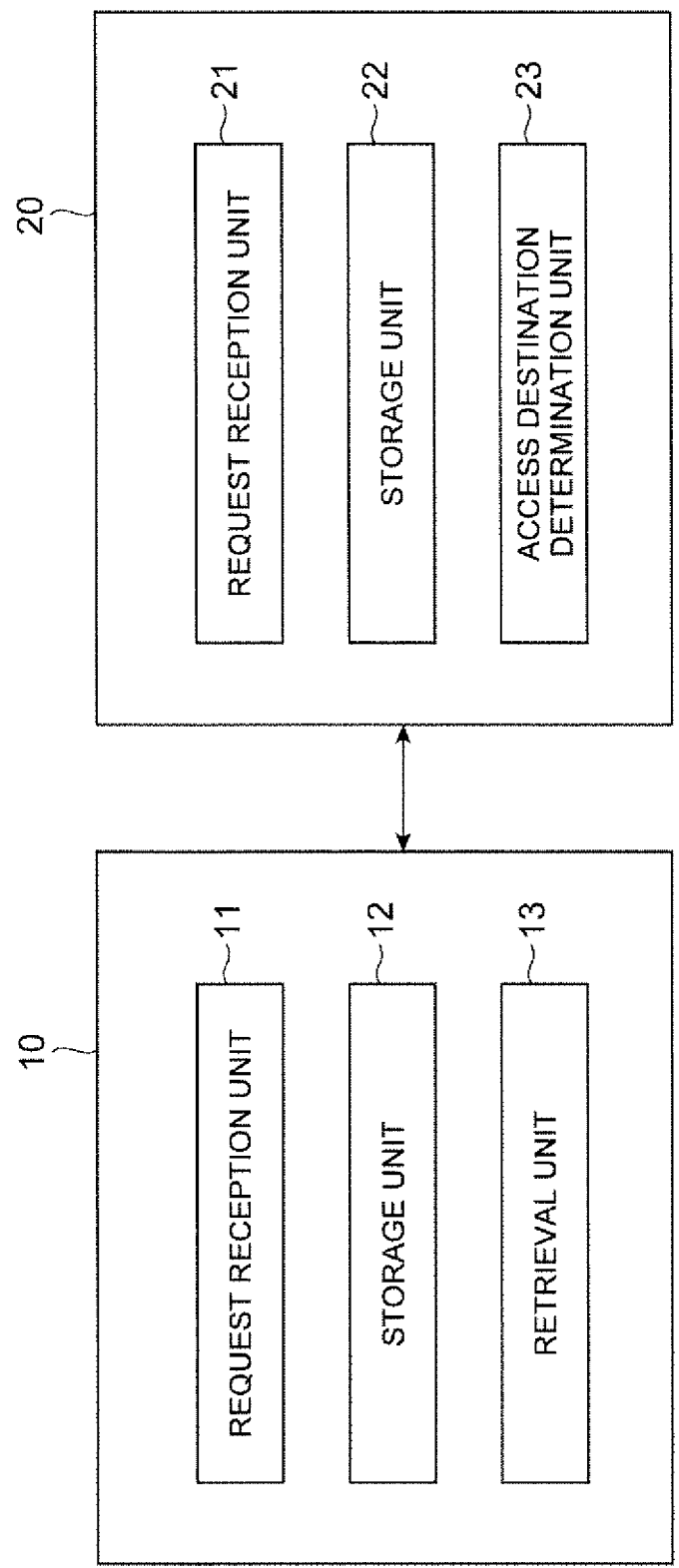
FIG. 3 is a functional block diagram of a slice selection device and a DB server.

As illustrated in FIG. 3, the DB server 10 is configured to include a request reception unit 11, a storage unit 12, and a retrieval unit 13 (a selection unit). Further, the slice selection device 20 is configured to include a request reception unit 21, a storage unit 22, and an access destination determination unit 23 (a selection unit).

First, functions of the slice selection device 20 will be described in detail. The request reception unit 21 acquires a service type from the AAA server 30 or the MME 40 and also receives a notification request for an access destination corresponding to a communication service (service type) to be used by the UE 50. When the request reception unit 21 receives the notification request for the access destination, the request reception unit 21 sends the service type to the access destination determination unit 23.

The storage unit 22 is a unit that stores information (correspondence information) in which the service type and an address of an access destination corresponding to the service type are associated with each other. An example of information stored in the storage unit 22 is illustrated in FIG. 4. As illustrated in (A) of FIG. 4, the slice selection device 20A stores a "service type" indicating the service type and "access destination information" that is address information indicating an address of the access destination (an address of the SGW 80) in association with each other. Further, as illustrated in (B) of FIG. 4, the slice selection device 20A stores a "service type" indicating the service type and "access destination information" that is address information indicating an address of the access destination (an address of the ePDG 70 or the PGW 90) in association with each other. Thus, the storage unit 22 stores address information of the ePDG 70 corresponding to the service type and the address information of the PGW 90 corresponding to the service type.

The access destination determination unit 23 is a unit that determines the presence or absence of (the ePDG 70, the PGW 90, and the SGW 80) of the gateway device corresponding to the communication service to be used by the UE 50 in one of the cellular communication and the non-cellular communication. The access destination determination unit 23 searches for address information corresponding to the service type acquired from the request reception unit 21 by referring to the storage unit 22. Using a result of the search, the access destination determination unit 23 determines the presence or absence of address information corresponding to the service type in the storage unit 22. When there is the address information corresponding to the service type in the storage unit 22, the access destination determination unit 23 transmits the address information to the AAA server 30 or the MME 40. Thus, when there is the address information corresponding to the service type in the storage unit 22, the access destination determination unit 23 selects the gateway device indicated by the address information (determines the gateway device that is an access destination). When there is no address information corresponding to the service type in the storage unit 22, the access destination determination unit 23 transmits information indicating the communication type (cellular communication or non-cellular communication) corresponding to the slice selection device 20 and the service type to the DB server 10, and also inquires about whether or not there is an access destination corresponding to the service type in another communication type.

When the access destination determination unit 23 receives the information (a re-access request) indicating that there is an access destination from the DB server 10 in response to the above inquiry, the access destination determination unit 23 notifies the AAA server 30 or the MME 40 of the re-access request. Further, when the access destination determination unit 23 receives information indicating that there is no access destination from the DB server 10 in response to the above inquiry, the access destination determination unit 23 searches for address information indicating the access destination of the default slice by referring to the storage unit 22 and transmits the address information to the AAA server 30 or the MME 40. Thus, the access destination determination unit 23 searches for the address information indicating the access destination of the default slice, and transmits the address information to the AAA server 30 or the MME 40 to select the gateway device of the default slice.

Next, a function of the DB server 10 will be described in detail. The request reception unit 11 is a unit that receives the service type and the communication type (cellular communication or non-cellular communication) corresponding to the slice selection device 20 from the slice selection device 20 and also receives an address transmission request. The request reception unit 11 sends the received service type and the communication type to the retrieval unit 13.

The storage unit 12 is a unit that stores information in which the service type and address information corresponding to the service type are associated with each other. The storage unit 12 stores information in which the service type illustrated in (A) of FIG. 4 and the address of the SGW 80 are associated with each other, and stores information in which the service type illustrated in (B) of FIG. 4 and the address of the ePDG 70 or the POW 90 are associated with each other. That is, the storage unit 12 stores information ((A) of FIG. 4) in which the service type and the address information are associated with each other in the cellular communication, and also stores information ((B) of FIG. 4) in which the service type and the address information are associated with each other in the non-cellular communication. It should be noted that the storage unit 12 stores the correspondence information in association with the communication type.

The retrieval unit 13 is a unit that performs search for the gateway device corresponding to the communication service to be used by the UE 50 by referring to correspondence information in which a communication service and a gateway device that performs communication for using the communication service are associated with each other in one of the cellular communication and the non-cellular communication when there is no gateway device corresponding to the communication service to be used by the UE 50 in the other of the cellular communication and the non-cellular communication.

When the retrieval unit 13 acquires the communication type and the service type from the request reception unit 11, the retrieval unit 13 acquires address information corresponding to the service type by referring to the correspondence information in a communication type different from such a communication type. Specifically, when the communication type is cellular communication, the retrieval unit 13 acquires the address information corresponding to the service type by referring to information in which the service type and the address information are associated with each other in the non-cellular communication. Further, when the communication type is non-cellular communication, the retrieval unit 13 acquires the address information corresponding to the service type by referring to information in which the service type and the address information are associated with each other in the cellular communication. When the retrieval unit 13 acquires the address information by referring to the correspondence information stored in the storage unit 12, the retrieval unit 13 transmits the fact that there is the access destination to the AAA server 30 or the MME 40. Further, when the retrieval unit 13 cannot acquire the address information by referring to the correspondence information stored in the storage unit 12, the retrieval unit 13 transmits the fact that there is no access destination to the AAA server 30 or the MME 40.

Figure 5:
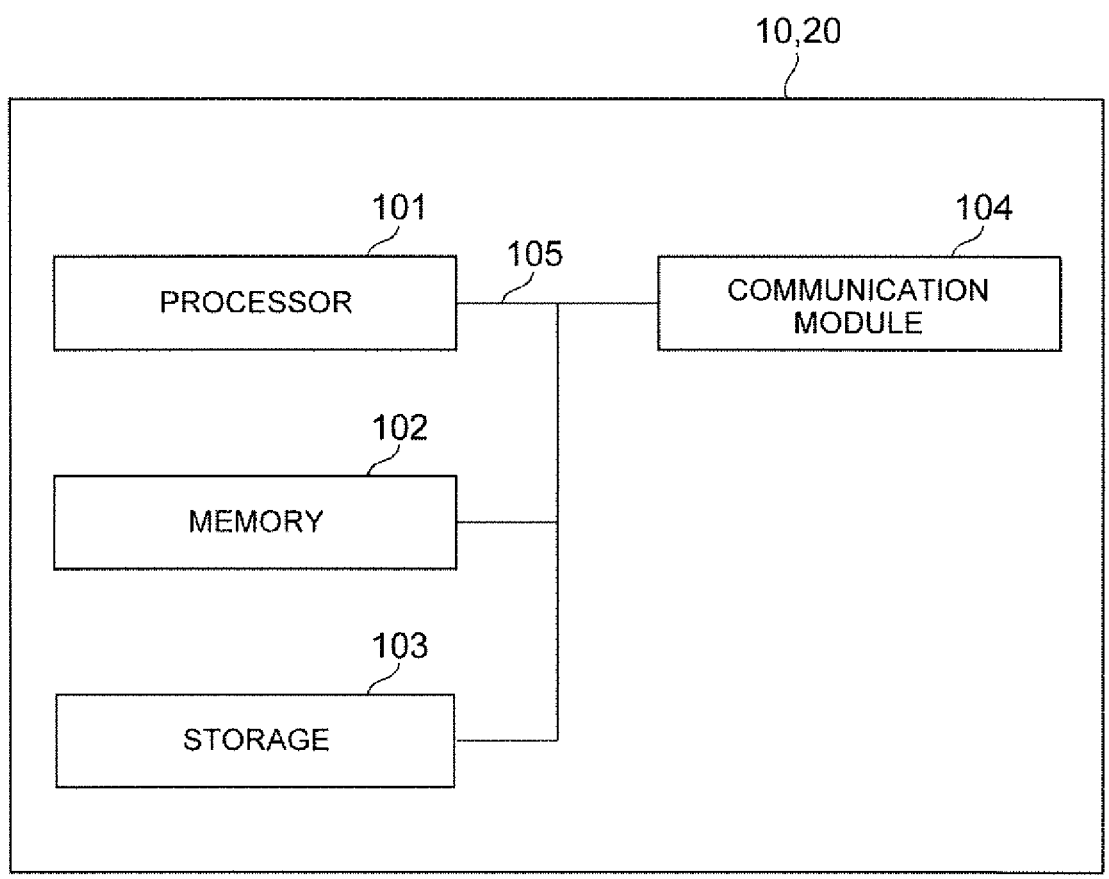
FIG. 5 is a diagram illustrating a hardware configuration of the slice selection device and the DB server.

Subsequently, FIG. 5 illustrates a hardware configuration of the DB server 10 and the slice selection device 20 according to the embodiment. Functional blocks (constituent units) of the DB server 10 and the slice selection device 20 are realized by an arbitrary combination of hardware and/or software. Further, a means for realizing each functional block is not particularly limited. That is, each functional block may be realized by one physically and/or logically coupled device or may be realized by a plurality of devices in which two or more physically and/or logically separated devices may be accessed directly and/or indirectly (for example, by a cable and/or wirelessly).

For example, the DB server 10, the slice selection device 20, or the like according to an embodiment of the present invention may function as a computer that selects a slice. The DB server 10 and the slice selection device 20 described above may be physically configured as a computer device including a processor 101, a memory 102, a storage 103, a communication module 104, and the like.

It should be noted that in the following description, a term "device" can be referred to as a circuit, device, unit, or the like. The hardware configuration of the slice selection device 20 may be configured to include one or a plurality of devices illustrated in FIG. 5 or may be configured not to include some of the devices.

Each function in the DB server 10 and the slice selection device 20 is realized by loading predetermined software (program) into a hardware such as the processor 101 or the memory 102 so that the processor 101 performs computation to control communication using the communication module 104 and reading and/or writing data from and/or to the memory 102 and the storage 103.

The processor 101 operates, for example, an operating system to control the entire computer. The processor 101 may include a central processing unit (CPU) including an interface with a peripheral device, a control device, a computation device, a register, and the like. For example, the request reception unit 11, the retrieval unit 13, the request reception unit 21, and the access destination determination unit 23 described above may be realized by the processor 101.

Further, the processor 101 reads a program (program code), a software module, and data from the storage 103 and/or the communication module 104 to the memory 102, and executes various processes according to these. As the program, a program for causing the computer to execute at least part of the operation described in the above-described embodiment is used. For example, the DB server 10 and the slice selection device 20 may be realized by a control program stored in the memory 102 and operating on the processor 101 or other functional blocks may be realized in a similar manner. Although the example in which the various processes described above are executed by one processor 101 has been described, the processes may be executed simultaneously or sequentially by two or more processors 101. The processor 101 may be realized using one or more chips. It should be noted that the program may be transmitted from a network via an electrical communication line.

The memory 102 is a computer-readable recording medium and is configured of, for example, at least one of a read only memory (ROM), an erasable programmable ROM (EPROM), an electrically erasable programmable ROM (EEPROM), and a random access memory (RAM). The memory 102 may be referred to as a register, a cache, a main memory (a main storage device), or the like. The memory 102 can store an executable program (program code), a software module, and the like for implementing the method according to an embodiment of the present invention.

The storage 103 is a computer-readable recording medium, and may be configured of, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 103 may be referred to as an auxiliary storage device. The storage medium described above may be, for example, a database including the memory 102 and/or the storage 103, a server, or other appropriate medium.

The communication module 104 is hardware (a transmission and reception device) for performing communication between computers via a wired and/or wireless network, and is also referred to as, for example, a network device, a network controller, or a network card.

Further, the respective devices such as the processor 101 and the memory 102 are connected by a bus 105 for communicating information. The bus 105 may be configured of a single bus or may be configured of buses different between the devices.

Further, the DB server 10 and the slice selection device 20 may include hardware such as a microprocessor, a digital signal processor (DSP), an application specific integrated circuit (ASIC), a programmable logic device (PLD), or a field programmable gate array (FPGA), and part or all of each functional block may be realized by the hardware. For example, the processor 101 may be realized using at least one piece of such hardware. The above is a configuration of the DB server 10 and the slice selection device 20 according to the embodiment.

Figure 6:
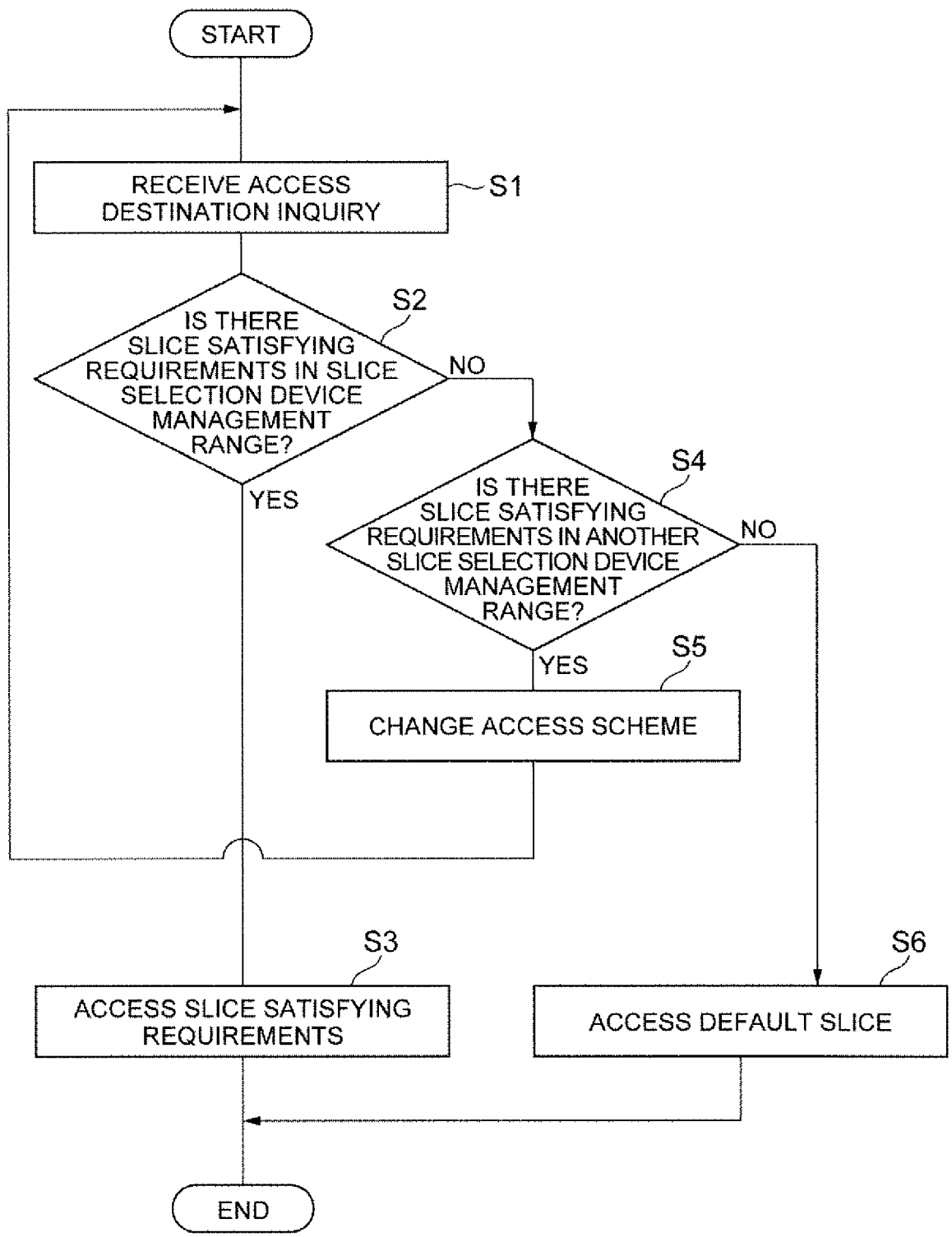
FIG. 6 is a flowchart for determining a slice that is an access destination in the slice selection device and the DB server.

Next, a procedure in which the slice selection device 20 receives an access destination and determines the access destination will be described with reference to FIG. 6. The request reception unit 21 of the slice selection device 20 acquires the service type from the AAA server 30 or the MME 40 and receives an inquiry of the access destination (step S1). Subsequently, the access destination determination unit 23 determines whether there is address information corresponding to the service type by referring to the information stored in the storage unit 22 (step S2). When there is the address information corresponding to the service type (step S2: YES), the access destination determination unit 23 notifies the AAA server 30 or the MIME 40 that is a request source of the address information and accesses the device corresponding to the address information (step S3).

When there is no address information corresponding to the service type (step S2: NO), the access destination determination unit 23 transmits a communication type and the service type to the DB server 10, and the retrieval unit 13 of the DB server 10 searches for address information corresponding to the service type in the communication type different from such a communication type (step S4). When there is such address information (step S4: YES), a re-access request is notified of the AAA server 30 or the MME 40 that is a request source. In response to the re-access request, the UE 50 changes an access scheme (step S5), accesses the AAA server 30 or the MME 40 of another communication type, and proceeds to step S1. In step S4, when there is no address information (step S4: NO), the slice selection device 20 notifies the AAA server 30 or the MME 40 of the access destination of the default slice and accesses the device that is an access destination (step S6).

Figure 7:
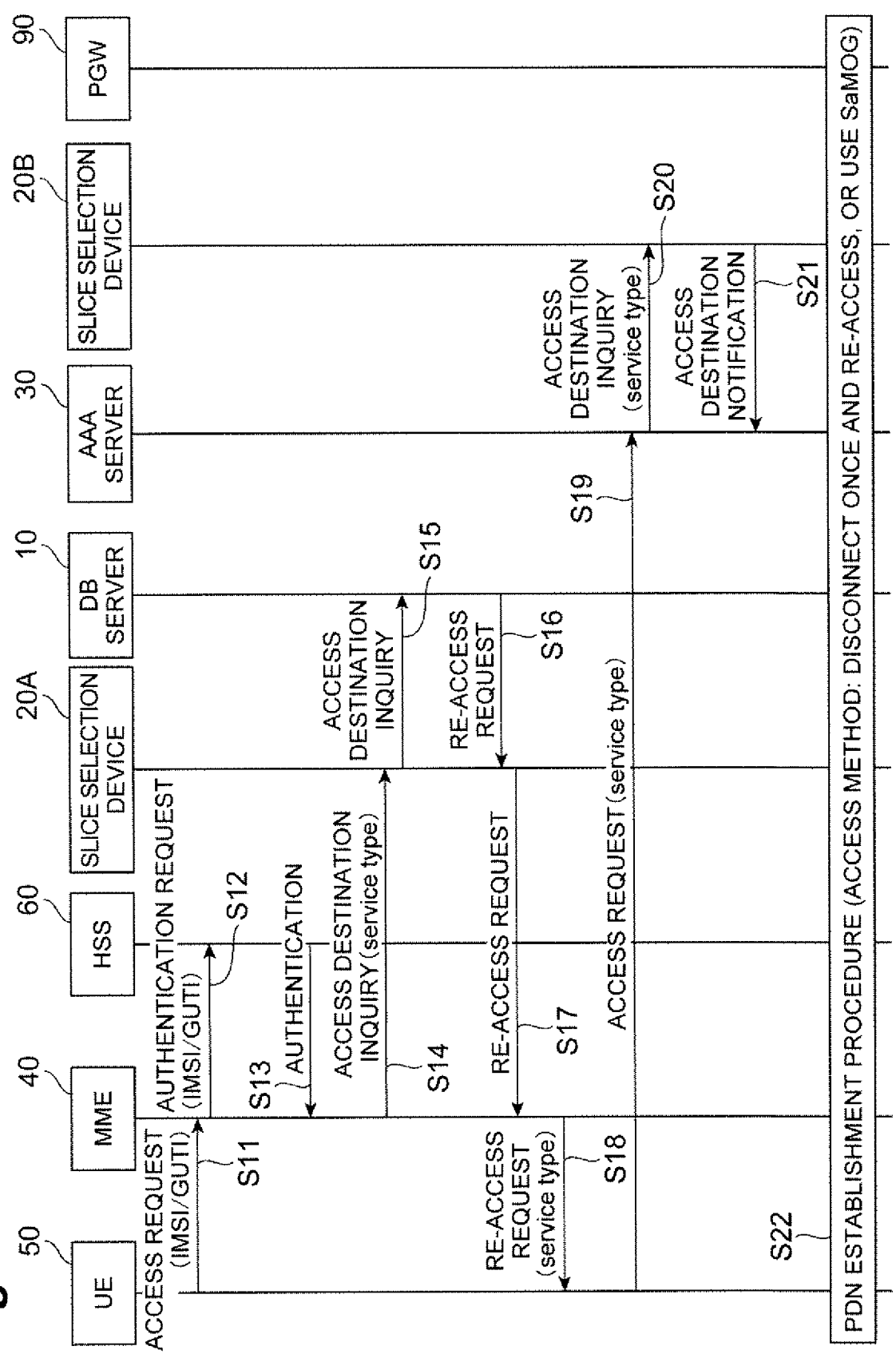
FIG. 7 is a sequence diagram for determining an access destination corresponding to a communication service through access changing from non-cellular communication to cellular communication.
Figure 8:
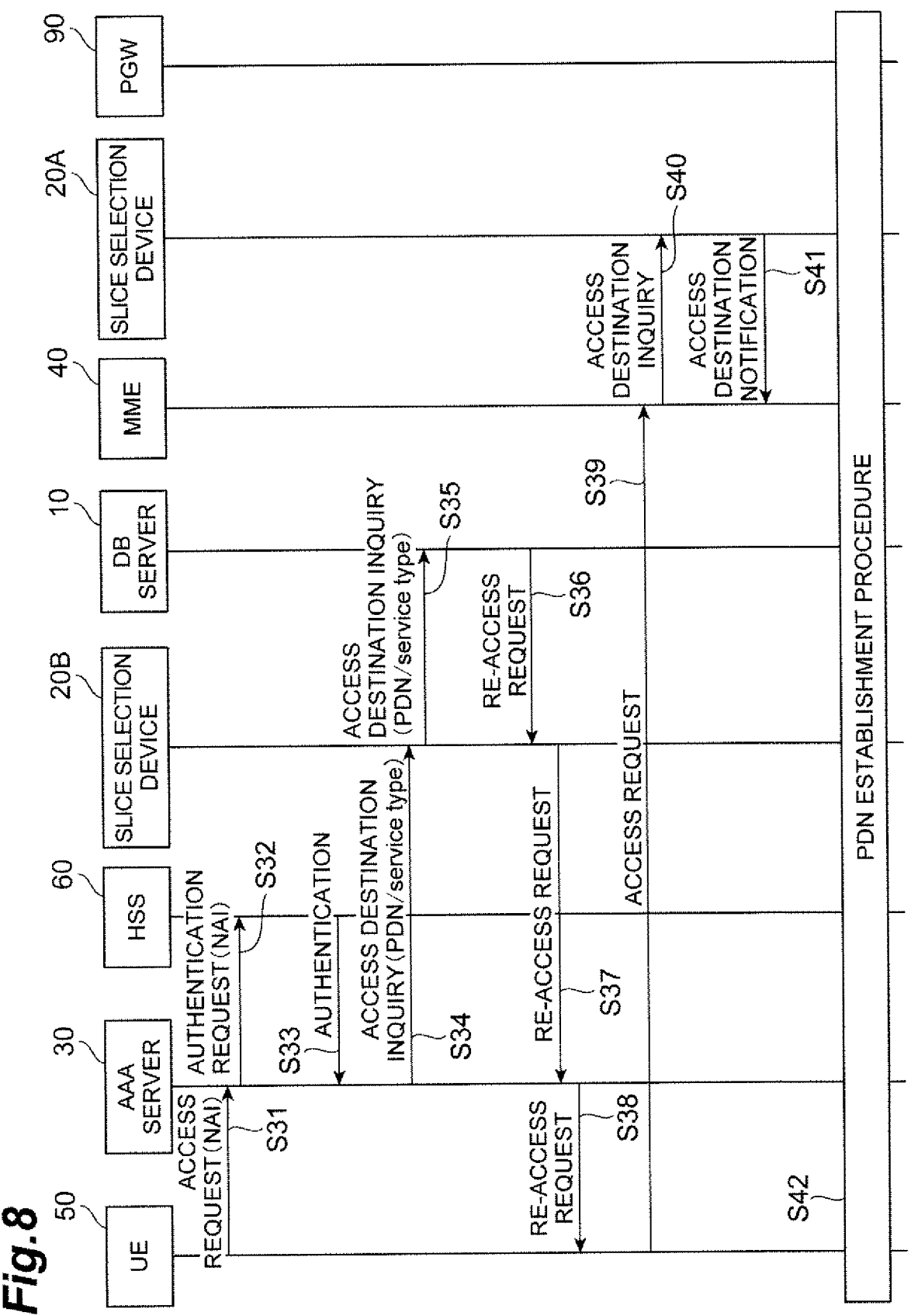
FIG. 8 is a sequence diagram for determining an access destination corresponding to a communication service through access changing from cellular communication to non-cellular communication.

Next, a method of accessing the access destination in the communication system 1 will be described with reference to FIGS. 7 and 8. FIG. 7 is a sequence diagram illustrating a process of accessing an access destination corresponding to the service type in non-cellular communication when there is no access destination as a result of searching for an access destination corresponding to the service type in cellular communication. FIG. 8 is a sequence diagram illustrating a process of accessing an access destination corresponding to the service type in the cellular communication when there is no access destination as a result of searching for the access destination corresponding to the service type in the non-cellular communication.

First, the process of accessing an access destination corresponding to the service type in non-cellular communication when there is no access destination as a result of searching for an access destination corresponding to the service type in cellular communication will be described with reference to FIG. 7.

First, the UE 50 transmits an IMSI to the MME 40 and makes an access request (step S11). When the MME 40 receives the access request, the MME 40 transmits the IMSI to the HSS 60 and makes an authentication request (step S12). The HSS 60 searches for a service type corresponding to the IMSI and transmits the service type to the MME 40 (step S13). The MIME 40 transmits the service type received from the HSS 60 to the slice selection device 20A and makes an access destination inquiry. The request reception unit 21 of the slice selection device 20A receives the access destination inquiry (step S14). The access destination determination unit 23 of the slice selection device 20A searches for the access destination corresponding to the service type by referring to the information stored in the storage unit 22, and transmits the service type and the communication type to the DB server 10 and makes an access destination inquiry when the access destination determination unit 23 determines that there is no access destination. In response thereto, the request reception unit 11 receives the request for the access destination inquiry (step S15). The retrieval unit 13 of the DB server 10 searches for an access destination corresponding to the service type in a communication type different from such a communication type. When there is such an access destination, the retrieval unit 13 sends a re-access request to the slice selection device 20A. The access destination determination unit 23 of the slice selection device 20A receives the re-access request (step S16). The access destination determination unit 23 transmits the service type and sends a re-access request to the MME 40. The MME 40 receives the service type and receives the re-access request (step S17). The MME 40 notifies the UE 50 of service parameters and sends the re-access request (step S18). The UE 50 changes an access method, transmits the service type, and sends an access request to the AAA server 30 (step S19). The AAA server 30 transmits the service type to the slice selection device 20B and makes an access destination inquiry (step S20). The slice selection device 20B searches for address information corresponding to the service type and transmits the address information to the AAA server 30 (step S21). Subsequently, the access destination corresponding to the address information is accessed (step S22). For example, the access destination is accessed using a known scheme, such as accessing the access destination after once disconnection or using SaMOG. Thus, the access destination determination unit 23 of the slice selection device 20A searches for the address information corresponding to the service type. When there is no address information as a result of the search of the access destination determination unit 23, the retrieval unit 13 of the DB server 10 searches for the address information corresponding to the service type in the non-cellular communication and transmits a result of the search (a re-access request) to the slice selection device 20A. In response thereto, the access destination determination unit 23 of the slice selection device 20B searches for the address information corresponding to the service type and selects the address information that has been searched for. That is, the access destination determination unit 23 of the slice selection device 20B selects the address information on the basis of the search result of the DB server 10.

Subsequently, a process of accessing the access destination corresponding to the service type in the cellular communication when there is no access destination as a result of searching for the access destination corresponding to the service type in the non-cellular communication will be described with reference to FIG. 8.

First, the UE 50 transmits the NAI to the AAA server 30 and makes an access request (step S31). When the AAA server 30 receives the access request, the AAA server 30 transmits the NM to the HSS 60 and makes an authentication request (step S32). The HSS 60 searches for the service type corresponding to the NM and transmits the service type to the AAA server 30 (step S33). The AAA server 30 transmits the service type received from the HSS 60 to the slice selection device 20B and makes an access destination inquiry. The request reception unit 21 of the slice selection device 20B receives the access destination inquiry (step S34). The access destination determination unit 23 of the slice selection device 20B searches for the access destination corresponding to the service type by referring to the information stored in the storage unit 22, and transmits the service type and the communication type to the DB server 10 and makes an access destination inquiry when the access destination determination unit 23 determines that there is no access destination. In response thereto, the request reception unit 11 receives the request (step S35). The retrieval unit 13 of the DB server 10 searches for the access destination corresponding to the service type in a communication type different from such a communication type. When there is the access destination, the retrieval unit 13 sends a re-access request to the slice selection device 20B. The access destination determination unit 23 of the slice selection device 20B receives the re-access request (step S36). The access destination determination unit 23 transmits the service type and sends a re-access request to the AAA server 30. The AAA server 30 receives the service type and receives the re-access request (step S37). The AAA server 30 notifies the UE 50 of the service parameter and makes a re-access request (step S38). The UE 50 changes the access method, transmits the service type, and sends an access request to the MME 40 (step S39). The MME 40 transmits the service type to the slice selection device 20A and also makes an access destination inquiry (step S40). The slice selection device 20A searches for address information corresponding to the service type and transmits the address information to the MME 40 (step S41). Subsequently, the access destination corresponding to the address information is accessed (step S42). For example, the access destination is accessed using a known scheme, such as accessing the access destination after once disconnection or using SaMOG.

In the above-described embodiment, the case in which the service type is associated with the address of the ePDG 70 or the PGW 90 has been described. Information capable of specifying a service, such as a UE usage type, a service parameter, an access point name (APN), or a dedicated core network (DCN) may be used instead of this service type.

Although the case in which the slice selection device 20 is an independent device has been described in the above embodiment, the slice selection device 20 may be incorporated in another device. For example, the AAA server 30 or the MIME 40 may function as the slice selection device 20.

In the above-described embodiment, the case in which the HSS 60 stores the information in which the user information and the service type are associated with each other, and the slice selection device 20 stores the information in which the service type and the access destination information are associated with each other has been described. Instead, the slice selection device 20 may store information obtained by combining two pieces of such information. That is, the slice selection device 20 may store information in which user information, service type, and access destination information are associated with each other as illustrated in FIG. 9. In this case, the AAA server 30 transmits the user information to the slice selection device 20 and makes an inquiry about access destination information without inquiring of the HSS 50 about the service type.

Further, in the above-described embodiment, the case where the DB server 10 notifies the slice selection device 20 of the presence or absence of the address information corresponding to the service type has been described. Instead, the DB server 10 may notify the slice selection device 20 of the address information. That is, the DB server 10 may select the gateway device by outputting the address information as a search result.

As described above, in the communication system 1, when there is no access destination corresponding to the service type to be used by the UE 50 in one of the cellular communication and the non-cellular communication, the retrieval unit 13 of the DB server 10 refers to the correspondence information in the other of the cellular communication and the non-cellular communication, and the access destination determination unit 23 selects the access destination corresponding to the service type.

Thus, when there is no access destination corresponding to the service type to be used by the UE 50 in one of the cellular communication and the non-cellular communication, the DB server 10 selects the access destination corresponding to the service type to be used by the UE 50 in the other of the cellular communication and the non-cellular communication, it is possible to select the access destinations suitable for the service type to be used by the UE 50 from both the cellular communication and the non-cellular communication.

Further, the retrieval unit 13 searches for the access destination corresponding to the service type by referring to the correspondence information in the other one of the cellular communication and the non-cellular communication, and the access destination determination unit 23 selects the access destination corresponding to the service type on the basis of a result of the search. Thus, since the access destination is selected on the basis of the search result of the searching unit 13, the access destination can be selected on the basis of the result of determining whether or not there is the access destination corresponding to the service type in the other. That is, it is possible to select the access destinations suitable for the service type to be used by the UE 50 from both the cellular communication and the non-cellular communication.

Further, the access destination determination unit 23 of the slice selection device 20 determines whether there is an access destination corresponding to the service type in one of the cellular communication and the non-cellular communication, and requests the DB server 10 to search for the access destination corresponding to the service type in the other when there is no access destination corresponding to the service type.

In this case, since the access destination determination unit 23 determines whether there is an access destination corresponding to the service type in one of the cellular communication and the non-cellular communication and then determines whether there is an access destination corresponding to the service type in the other of the cellular communication and the non-cellular communication, it is possible to perform searching efficiently.

Further, in the retrieval unit 13 of the DB server 10 in the communication system 1, when there is an access destination corresponding to the service type in the other of the cellular communication and the non-cellular communication, the slice selection device 20 having the information of the access destination outputs information on the access destination as a search result of the DB server 10. In this case, it is possible to appropriately notify of the access destination corresponding to the service type in the other of the cellular communication and the non-cellular communication.

Further, in the retrieval unit 13 of the DB server 10 in the communication system 1, when there is no access destination corresponding to the service type in the other of the cellular communication and the non-cellular communication, the slice selection device 20 outputs a predetermined access destination (an access destination of a default slice) as a search result of the DB server 10. In this case, when there is no access destination corresponding to the service type in both of the cellular communication and the non-cellular communication, service type requirements are not satisfied, but the communication service can be provided as a next-best solution.

The software is referred to as software, firmware, middleware, microcode, or hardware description language, and can be construed widely to mean instructions, an instruction set, codes, code segments, program codes, a program, a subprogram, a software module, an application, a software application, a software package, a routine, a subroutine, an object, an executable file, an execution thread, a procedure, a function, or the like even though the software is referred to as another name.

In addition, software, instructions, and the like may be transmitted and received via a transmission medium. For example, when the software may be transmitted from a website, a server, or another remote source using wired technology such as a coaxial cable, a fiber optic cable, a twisted pair, or a digital subscriber line (DSL) and/or wireless technology such as infrared rays, wireless technology, or microwaves, these wired and/or wireless technologies are included within a definition of the transmission medium.

The information, signals, or the like described in the patent specification may be represented using any of a variety of different technologies. For example, data, instruction, command, information, signal, bit, symbol, chip, or the like that may be mentioned throughout the above description may be represented by voltage, current, electromagnetic waves, magnetic field or particles, or optical field or photons, or in combination.

It should be noted that the terms described in the patent specification and/or terms necessary for understanding of the patent specification may be replaced with terms having the same or similar meanings.

The terms "system" and "network" used in the patent specification are used interchangeably.

Further, the information, parameters, and the like described in the patent specification may be represented as absolute values, may be represented as relative values from predetermined values, or may be represented by other corresponding information. For example, wireless resource may be indicated by an index.

A description "on the basis of" used in the patent specification does not mean "on the basis of only" unless explicitly stated otherwise. In other words, the description "on the basis of" means both "on the basis of only" and "on the basis of at least".

Further, the "means" in the configuration of each of the above devices may be replaced with "unit", "circuit", "device", or the like.

"Including", "comprising", and modifications thereof are intended to be comprehensive like the term "comprising" as long as these are used in the patent specification or claims. Further, the term "or" used in the patent specification or claims is intended not to be exclusive disjunction.

In the patent specification, it is assumed that a plurality of devices are included in cases other than a case in which there is only one device obviously in the context or technically.

Further, each aspect/embodiment described in the patent specification can be applied to a system that uses long term evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark), or another suitable system, and/or a next-generation system expanded based on these.

Further, an order of a processing procedure, sequence, flowchart, and the like of each aspect/embodiment described in the patent specification may be changed as long as there is no inconsistency. For example, in the method described in the patent specification, elements of the various steps are presented in an exemplary order and are not limited to the presented specific order.

Input or output information or the like may be stored in a specific place (for example, a memory) or managed in a management table. Information or the like to be input or output can be overwritten, updated, or additionally written. Output information or the like may be deleted. Input information or the like may be transmitted to another device.

Each aspect or embodiment described in the patent specification may be used singly, may be in combination, or may be switched according to execution and used. Further, a notification of predetermined information (for example, a notification of "being X") is not limited to being performed explicitly, but may be performed implicitly (for example, not by notifying the predetermined information).

Throughout this disclosure, it is assumed that both singular and plural are intended to be included unless singular is clearly indicated.

Although the present invention has been described above in detail, it will be obvious to those skilled in the art that the present invention is not limited to the embodiments described in the patent specification. The present invention can be realized as variation and modification aspects without departing from the spirit and scope of the present invention as defined by the claims. Therefore, the description of the patent specification is intended for illustration and does not have any restrictive meaning with respect to the present invention.

REFERENCE SIGNS LIST

1 . . . Communication system, 10 . . . DB server, 11 . . . Request reception unit, 12 . . . Storage unit, 13 . . . Retrieval unit, 20 . . . Slice selection device, 21 . . . Request reception unit, 22 . . . Storage unit, 23 . . . Access destination determination unit, 30 . . . AAA server, 40 . . . MME, 50 . . . UE (terminal), 60 . . . HSS, 70 . . . ePDG, 80 . . . SGW, 90 . . . PGW, 101 . . . Processor, 102 . . . Memory, 103 . . . Storage, 104 . . . Communication module, 105 . . . Bus.

The invention claimed is:

1. A gateway selection method for selecting a gateway device that constitutes a slice satisfying requirements of a communication service to be used by a terminal, the gateway selection method being executed by a communication system including the terminal capable of using a communication service and a plurality of gateway devices, the communication system being a system where a plurality of slices are generated, each slice being a virtual network or a service network logically generated on a network infrastructure, the gateway selection method comprising:

a determination step of determining whether or not there is a gateway device that constitutes a slice satisfying requirements of the communication service used by the terminal in one of the cellular communication and the non-cellular communication, a selection step of selecting, when there is no gateway device that constitutes the slice satisfying the requirements of the communication service in one of the cellular communication and the non-cellular communication, a gateway device that constitutes the slice satisfying the requirements of the communication service to be used by the terminal by referring to correspondence information in which a communication service and a gateway device that constitutes the slice satisfying the requirements of the communication service are associated with each other, in the other of cellular communication and non-cellular communication.

2. The gateway selection method according to claim 1, wherein the selection step includes:

searching for the gateway device that constitutes a slice satisfying the requirements of the communication service to be used by the terminal by referring to the correspondence information, and selecting the gateway device that constitutes the slice satisfying the requirements of the communication service to be used by the terminal on the basis of the search result.

3. The gateway selection method according to claim 2, wherein the selection step includes:

performing the search when it is determined in the determination step that there is no gateway device that constitutes the slice satisfying the requirements of the communication service to be used by the terminal.

4. The gateway selection method according to claim 2, wherein the selection step includes:

outputting an address of the gateway device as a search result when there is a gateway device that constitutes the slice satisfying the requirements of the communication service to be used by the terminal as the result of searching for the gateway device that constitutes the slice satisfying the requirements of the communication service to be used by the terminal, and selecting the gateway device at the outputted address.

5. The gateway selection method according to claim 2, wherein the selection step includes:

outputting an address of a predetermined gateway device as a search result when there is no gateway device that constitutes the slice satisfying the requirements of the communication service to be used by the terminal as the result of searching for the gateway device that constitutes the slice satisfying the requirements of the communication service to be used by the terminal, and selecting the gateway device at the outputted address.

6. The gateway selection method according to claim 3, wherein the selection step includes:

outputting an address of the gateway device as a search result when there is a gateway device that constitutes the slice satisfying the requirements of the communication service to be used by the terminal as the result of searching for the gateway device that constitutes the slice satisfying the requirements of the communication service to be used by the terminal, and selecting the gateway device at the outputted address.

7. The gateway selection method according to claim 3, wherein the selection step includes:

outputting an address of a predetermined gateway device as a search result when there is no gateway device that constitutes the slice satisfying the requirements of the communication service to be used by the terminal as the result of searching for the gateway device that constitutes the slice satisfying the requirements of the communication service to be used by the terminal, and selecting the gateway device at the outputted address.

8. The gateway selection method according to claim 4, wherein the selection step includes:

outputting an address of a predetermined gateway device as a search result when there is no gateway device that constitutes the slice satisfying the requirements of the communication service to be used by the terminal as the result of searching for the gateway device that constitutes the slice satisfying the requirements of the communication service to be used by the terminal, and selecting the gateway device at the outputted address.

9. A communication system including a terminal capable of using a communication service and a plurality of gateway devices that perform communication for using the communication service, the communication system being a system where a plurality of slices are generated, each slice being a virtual network or a service network logically generated on a network infrastructure, the communication system comprising:

a circuitry configured to:

determine whether or not there is a gateway device that constitutes a slice satisfying requirements of the communication service used by the terminal in one of the cellular communication and the non-cellular communication, and select, when there is no gateway device that constitutes the slice satisfying the requirements of the communication service in one of the cellular communication and the non-cellular communication, a gateway device that constitutes the slice satisfying the requirements of the communication service to be used by the terminal by referring to correspondence information in which a communication service and a gateway device that constitutes the slice satisfying the requirements of the communication service are associated with each other, in the other of cellular communication and non-cellular communication.

* * * * *